United States Patent
Phillips et al.

(10) Patent No.: US 11,512,556 B2
(45) Date of Patent: Nov. 29, 2022

(54) FLOW INDUCED VIBRATION REDUCTION

(71) Applicant: Baker Hughes Energy Technology UK Limited, Bristol (GB)

(72) Inventors: Raymond Phillips, Bristol (GB); Anthony Jason Vangasse, Bristol (GB)

(73) Assignee: BAKER HUGHES ENERGY TECHNOLOGY UK LIMITED, Bristol (GB)

(*) Notice: Subject to any disclaimer, the term of this patent is extended or adjusted under 35 U.S.C. 154(b) by 0 days.

(21) Appl. No.: 16/637,844

(22) PCT Filed: Aug. 8, 2018

(86) PCT No.: PCT/EP2018/071549
§ 371 (c)(1),
(2) Date: Feb. 10, 2020

(87) PCT Pub. No.: WO2019/034498
PCT Pub. Date: Feb. 21, 2019

(65) Prior Publication Data
US 2020/0248528 A1 Aug. 6, 2020

(30) Foreign Application Priority Data

Aug. 15, 2017 (GB) ..................................... 1713055

(51) Int. Cl.
*E21B 33/035* (2006.01)
*E21B 33/038* (2006.01)
(Continued)

(52) U.S. Cl.
CPC .......... *E21B 34/02* (2013.01); *E21B 33/0355* (2013.01); *E21B 33/038* (2013.01);
(Continued)

(58) Field of Classification Search
CPC .... E21B 33/0355; E21B 33/038; E21B 34/02; E21B 34/025; E21B 34/04; E21B 43/12; E21B 47/09; G01V 1/38
See application file for complete search history.

(56) References Cited

U.S. PATENT DOCUMENTS 5,083,452 A    1/1992  Hope
7,931,090 B2 * 4/2011  Smedstad ............. E21B 43/128
                                                166/366

(Continued)

FOREIGN PATENT DOCUMENTS

EP    2891761 A2    7/2015
GB    2520479 A     5/2015
WO    8905974 A1    6/1989

OTHER PUBLICATIONS

Midtun, B., "Evaluation of hydro acoustic condition monitoring of subsea processing equipment," Master's thesis in Petroleum engineering, University of Stavanger, dated Jun. 8, 2011, Retrieved from the Internet URL: https://uis.brage.unit.no/uis-xmlui/bitstream/handle/11250/183307/Midtun%2CBeate%202011.pdf?sequence=1 &isAllowed=y, on Feb. 4, 2020, pp. 30-52.

(Continued)

*Primary Examiner* — Matthew R Buck
(74) *Attorney, Agent, or Firm* — Baker Hughes Patent Org.

(57) ABSTRACT

A method and apparatus are disclosed for reducing flow induced vibration in at least one subsea structure. The method comprises the steps of, via at least one subsea acoustic sensor (190), detecting at least one characteristic associated with acoustic energy in sea water proximate to the sensor (190), responsive to the detected characteristic, varying at least one operational parameter of a fluid flowing along a fluid flow pathway associated with a pipe member (160).

14 Claims, 3 Drawing Sheets

(51) Int. Cl.
  *E21B 34/02*   (2006.01)
  *E21B 34/04*   (2006.01)
  *E21B 43/12*   (2006.01)
  *G01V 1/38*    (2006.01)
  *E21B 47/09*   (2012.01)
(52) U.S. Cl.
  CPC .............. *E21B 43/12* (2013.01); *E21B 47/09* (2013.01); *G01V 1/38* (2013.01)

(56) References Cited

U.S. PATENT DOCUMENTS

| | | | |
|---|---|---|---|
| 7,967,066 B2 * | 6/2011 | McStay | E21B 33/0355 166/250.01 |
| 2013/0332079 A1 * | 12/2013 | Gudivada | G01V 1/008 702/14 |
| 2015/0177403 A1 * | 6/2015 | Haugen | E21B 47/001 73/152.47 |
| 2016/0376866 A1 | 12/2016 | Donald et al. | |
| 2017/0293043 A1 | 10/2017 | Haugen et al. | |
| 2018/0156026 A1 * | 6/2018 | Kalia | E21B 17/006 |
| 2018/0171759 A1 * | 6/2018 | Meyer | E21B 34/04 |

OTHER PUBLICATIONS

International Search Report of the International Searching Authority for PCT/EP2018/071549 dated Jan. 3, 2019.

\* cited by examiner

FLOW INDUCED VIBRATION REDUCTION

The present invention relates to a method and apparatus for reducing flow induced vibration of subsea structures. In particular, but not exclusively, the present invention relates to the use of one or more acoustic sensors to detect acoustic energy in sea water generated by a vibrating subsea structure and a flow control element for varying a parameter, such as flow rate, of fluid flowing along a pipe that comprises the structure, or is connected to the structure. Vibration can thereby be controlled.

Development of oil fields which are under water involves drilling a well on the sea bed. For those wells which are completed "subsea" the well is capped using a subsea tree. The subsea tree carries out multiple functions. One is to contain the natural pressure of a hydrocarbon reservoir and at least one further function is to control the flow of reservoir fluids from the well bore through a flow line to a subsea gathering facility. The control of flow is achieved with a number of control valves in the flow path of the fluids produced by the well. At least one of the control valves is a variable orifice type valve commonly known as a choke valve. Such a valve controls the rate of flow by causing a differential pressure drop across the choke valve between inlet and outlet.

The subsea tree also contains a number of sensors for measurement of pressures and temperatures of the produced fluids and to detect a position or state of the flow control valves. Conventionally the tree assembly is controlled by a Subsea Control Module (SCM). This commands the flow control valves. This is often achieved using a solenoid controlled actuator to pilot hydraulic or electrically powered actuators.

Conventionally a subsea tree is connected to a subsea manifold using a subsea flow line referred to as a "jumper". The manifold is arranged to collect hydrocarbon well bore fluids from several other wells where the collected fluids can be co-mingled into a common header. Such developments are often referred to as a manifold cluster development. The flow line jumper connection comprises a pipe that can be of a flexible type but may alternatively be a rigid pipe design using a zig-zag geometric shape. This helps provide a level of construction tolerance when connecting the tree to the manifold.

Conventionally a flow line jumper may be some 50 metres in span and is anchored at each end with a relatively free span there between. Vibration in subsea structures such as flow induced vibration in jumpers is a well acknowledged problem. Such vibration can cause the pipe and/or connected equipment to vibrate and this can lead to a reduction in life or catastrophic failure of those equipment components through fatigue or due to particularly increased energy levels at resonance frequencies.

For example flow induced vibration can be experienced as fluid flows along a pipeline and this is proportional to a velocity of fluid flow along a fluid pathway. In combination with the multi-phase nature of the flowing fluids the fluid flowing can impart small disturbance forces to the pipeline which can, particularly at resonance frequencies, be amplified by the structure.

Certain techniques have conventionally been used to monitor vibration of subsea structures. For example, mounting accelerometers directly onto a structure which may be subject to vibration has been suggested. Unfortunately this approach can limit the lifetime of the sensor as it is itself subject to the vibration.

In addition conventionally another suggestion has been to use a number of fixed subsea acoustic sensors (hydrophones). Such sensors can be used to monitor and diagnose conditions in mechanical equipment by interpreting acoustic energy signals. Likewise other systems have been proposed which use acoustic sensors to monitor acoustic energy in sea water and initiate maintenance procedures so that loss of production is avoided and/or can be planned and coordinated in advance. Unfortunately this can take some time to deal with a perceived problem and leads to costly maintenance procedures being needed.

It is an aim of the present invention to at least partly mitigate the above-mentioned problems.

It is an aim of certain embodiments of the present invention to provide a method and apparatus for reducing flow induced vibration in at least one subsea structure.

It is an aim of certain embodiments of the present invention to provide a system which can be readily incorporated into new development fields or retro fitted at so-called brown field sites to help mitigate flow induced vibration effects.

It is an aim of certain embodiments of the present invention to provide a method and apparatus for providing continuous feedback in a closed loop control arrangement whereby vibration is constantly monitored and one or more operational parameters such as flow rate or composition of a flowing fluid is varied to help control vibrational effects.

It is an aim of certain embodiments of the present invention to provide a method and apparatus for avoiding resonance when fluid flows along a fluid flow pathway including flow through a pipeline to help reduce structural damage to the pipeline or to a subsea structure connected to the pipeline.

According to a first aspect of the present invention there is provided a method for reducing flow induced vibration in at least one subsea structure, comprising the steps of:
  via at least one subsea acoustic sensor, detecting at least one characteristic associated with acoustic energy in sea water proximate to the sensor; and
  responsive to the detected characteristic, varying at least one operational parameter of a fluid flowing along a fluid flow pathway associated with a pipe member.

Aptly the step of varying at least one operational parameter comprises varying a flow rate of said a fluid.

Aptly said step of varying a flow rate comprises increasing or decreasing flow rate selectively or repeatedly.

Aptly the method further comprises varying flow rate in real time responsive to the detected at least one characteristic.

Aptly the method further comprises varying flow rate by selectively opening and/or closing a choke valve member in the fluid communication pathway.

Aptly the method further comprises determining a position of the choke valve via a solenoid operated pilot system.

Aptly the method further comprises providing at least one control signal, to determine a position of the choke valve to the choke valve or to a solenoid operated pilot system, via a Subsea Control Module (SCM).

Aptly the step of varying at least one operational parameter comprises varying a composition of the fluid.

Aptly the step of varying a composition of the fluid comprises varying a proportion of water and/or gas and/or sand in the fluid.

Aptly the method further comprises repeatedly or selectively increasing and/or decreasing composition selectively or in real time.

Aptly the method further comprises varying said operational parameter by automatically comparing a characteristic value comprising a value for the detected at least one characteristic, with at least one pre-stored value and automatically varying the operational parameter responsive thereto.

Aptly the method further comprises automatically varying the operational parameter to maintain a vibration value associated with vibration of the subsea structure below a predetermined threshold value.

Aptly the method further comprises automatically varying the operational parameter to maximise the operational parameter whilst maintaining said a vibration value below the predetermined threshold value.

Aptly the method further comprises automatically varying the operational parameter via a closed loop control system.

Aptly the method further comprises selectively varying said detected operational parameter to determine when the selected operational parameter value provides a minimum amplitude in the acoustic energy; and subsequently maintaining the operational parameter at the selected operational parameter value for a predetermined period of time comprising more than 5 seconds.

Aptly the method further comprises, after the predetermined period of time, repeating the steps of selectively varying said detected operational parameter and subsequently maintaining the operational parameter at a selected operational parameter value that provides a minimum amplitude in acoustic energy for a predetermined period of time.

Aptly the method further comprises varying said operational parameter by providing a human operator with a characteristic value comprising a value detected for the at least one characteristic; and providing at least one cue to the operator to vary said operational parameter.

Aptly the cue is an audible and/or visible cue.

Aptly the step of detecting at least one characteristic comprises determining a frequency and/or amplitude and/or incoming direction of the acoustic energy.

Aptly the step of detecting at least one characteristic comprises, via a subsea acoustic sensor, detecting acoustic energy in sea water proximate to the sensor.

Aptly the step of detecting acoustic energy comprises detecting acoustic energy in sea water distal to a subsea structure.

Aptly the method further comprises detecting acoustic energy in sea water at least 5 metres away from said subsea structure.

Aptly the method further comprises detecting acoustic energy in sea water at a location without a direct line of sight relationship between the acoustic sensor and the subsea structure.

According to a second aspect of the present invention there is provided apparatus for reducing flow induced vibration in at least one subsea structure, comprising:

at least one subsea acoustic sensor for providing an output signal indicating at least one characteristic associated with acoustic energy in sea water;

a processor element that receives a respective output signal from each acoustic sensor and provides a control output signal responsive thereto; and least one governor element having a plurality of selectable states each selectable responsive to the control output signal for varying at least one operational parameter of a fluid flowing along a fluid flow pathway associated with a pipe member.

Aptly the governor element comprises a choke valve having at least a closed state and a fully open state.

Aptly the choke valve comprises at least one partially open state.

Aptly the governor element comprises at least one valve that determines a composition of fluid flowing along the fluid communication pathway.

Aptly the apparatus further comprises a Subsea Electronics Module (SEM) comprising the processor element.

Aptly the apparatus further comprises a Subsea Control Module (SCM) comprising the SEM.

Aptly the apparatus further comprises a Top Side Control System comprising the processor element.

Aptly the at least one acoustic sensor comprises an acoustic sensor array.

Aptly each at least one acoustic sensor comprises a hydrophone.

Aptly the processor element receives data from a data store comprising resonance data for the subsea structure and/or pipe member and/or fatigue curve data for the subsea structure and/or pipe member.

According to a third aspect of the present invention there is provided a method for determining at least one resonance frequency associated with at least one subsea structure, comprising the steps of:

varying at least one operational parameter of a fluid flowing along a fluid flow pathway associated with a subsea pipe member, via at least one acoustic sensor, as the operational parameter is varied, detecting at least one characteristic associated with acoustic energy in sea water proximate to the sensor, and responsive to the detected characteristic, determining at least one resonance frequency associated with at least one subsea structure.

Aptly the method further comprises determining all at risk resonance frequencies associated with the subsea structure by varying the operational parameter through a full range of possible operational parameter values.

Aptly the method further comprises storing data identifying each at risk resonance frequency in a data store associated with the subsea structure.

Certain embodiments of the present invention enable flow induced vibration in at least one subsea structure to be controlled and/or at least partially reduced relative to conventional techniques.

Certain embodiments of the present invention utilise one or more acoustic sensors to detect at least one characteristic associated with acoustic energy in sea water. The characteristic can be a frequency and/or amplitude and/or incoming direction of the acoustic energy. Thereafter, responsive to the detected characteristic, an operational parameter associated with fluid flowing along a fluid flow pathway associated with a pipe member can be varied to bring the acoustic energy under control and keep it below a desired level. Aptly the acoustic sensors can be positioned remote from the vibrating structure.

Certain embodiments of the present invention provide constant feedback to a human operator indicating how at least one parameter associated with fluid flow along a fluid flow pathway should be varied to help reduce or eliminate vibrational effects.

Certain embodiments of the present invention provide a closed control system in which a fluid operational parameter or multiple operational parameters can automatically be varied dependent upon a detected characteristic of acoustic energy.

Certain embodiments of the present invention enable fluid flow along a fluid flow pathway to be maintained at a maximum flow rate just below a threshold that would cause vibrational effects to reach an unacceptable predetermined threshold limit. This effectively enables fluid flow to be maximised whilst ensuring vibrational effects are kept within a predefined "safe zone".

Certain embodiments of the present invention will now be described hereinafter, by way of example only, with reference to the accompanying drawings in which.

In the drawings like reference numerals refer to like parts.

Figure 1:
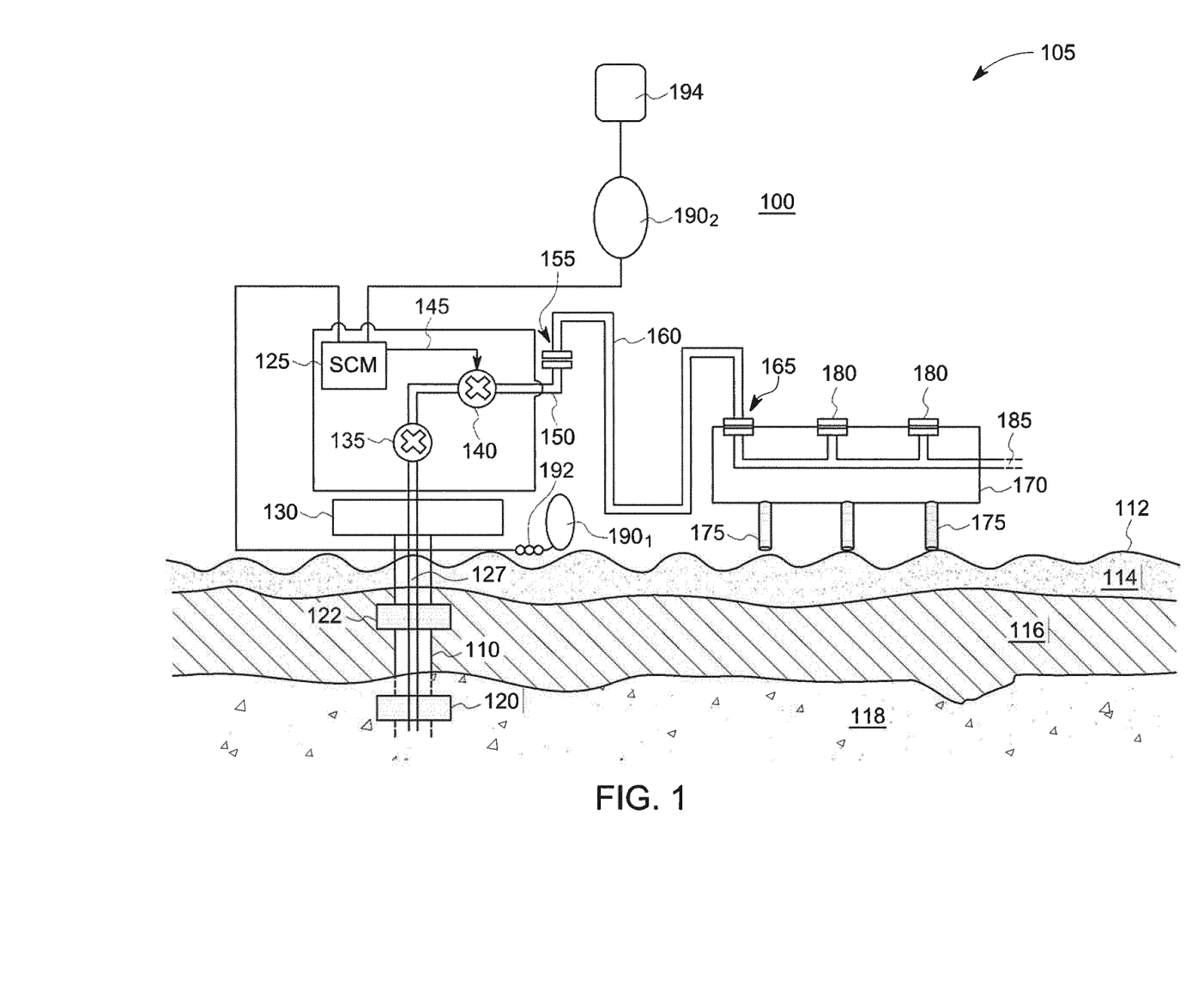
FIG. 1 illustrates a subsea environment.

FIG. 1 illustrates a subsea environment 100. In particular FIG. 1 illustrates a location of a subsea tree 105 which is located above a well bore 110 penetrating the sea bed 112. The well bore 110 passes through multiple layers under the sea bed 112. For example, as shown in FIG. 1, a first layer 114 immediately below the sea bed 112 comprises a band of material having a high sand content. A further layer 116 below the first layer 114 holds less sand. A still further layer 118 lies below the further layer 116 and holds little or no sand content. A hydrocarbon reserve may be found in a layer or in a region bridging multiple layers. It will be appreciated that the relative depths, thicknesses and sand/rock content will be different for each well bore location.

The well bore 110 passes through multiple layers and may pass many hundreds of metres or even more under the sea bed. The well bore 110 illustrated in FIG. 1 includes a first collar valve 120 in the deep layer 118 and a further collar valve 122 in the middle layer 116 shown in FIG. 1. Each collar valve 120, 122 is a selection element which effectively opens and closes under control of a Subsea Control Module (SCM) 125 in the subsea tree 105. By selectively controlling the open/closed status or, optionally, the partially open status of a respective collar valve 120, 122 liquid or gaseous components from the respective layers 116 can be gathered into the well bore region which contains a respective well bore production tubing 127. In this way a composition of fluid (proportion of gas or liquid or gas and liquid) can be selected. The fluid is thus multiphase in the sense that it can include different compositions of oil, gas, water and solid (sand or fine rock). It will be appreciated that certain embodiments of the present invention may include only a single bore with no collar valves in which case a composition of fluid flowing along a fluid flow pathway may be selected in other ways.

The subsea tree 105 is secured to a well head 130. This secures the subsea tree at a fixed desired location with respect to the sea bed 112. The well bore production tubing 127 passes through the well head into the subsea tree via an on/off flow isolation valve 135. This can be controlled via the SCM 125 to selectively permit fluid from the well bore production tubing 127 to flow to a desired downstream location via a fluid flow pathway which provides a fluid communication route.

As illustrated in FIG. 1 the subsea tree further includes a choke valve 140. This valve can selectively open and close or be partially opened using a variable orifice element to fully or partially constrain fluid flow along the fluid flow pathway. In this way the choke valve 140 governs flow rate, and thus an operational parameter of fluid flowing along a fluid flow pathway. Other types of governor element can of course be utilised dependent upon the operational parameter being governed. The choke valve 140 receives a control signal via a respective connection 145, from an SCM 125. In this way selection of the opening provided by the choke valve 140 can vary the fluid flowing along a fluid flow pathway. The choke valve is an example of an element that can select a flow rate or other parameter and which can be controlled via an input signal.

It will be appreciated that whilst an embodiment of the present invention has been described with respect to control using an SCM certain other embodiments of the present invention permit control via a 'Top Side' controller. For example the subsea tree 105 can be connected via one or more umbilicals to a Topside Umbilical Termination Assembly (TUTA) of an Floating Production Storage and Offloading (FPSO) facility. Two way communication between a Master Control Station (MCS) and the subsea tree 105 can be provided by conventional techniques As illustrated in FIG. 1 the pipe work 150 which helps define the fluid flow pathway is generally a rigid structure within the subsea tree. This is connected via a respective flow line connector 155 to a respective jumper 160. The jumper 169 shown in FIG. 1 is a rigid jumper although it will be appreciated that a flexible pipe may alternatively be utilised. A first end of the jumper 160 is connected to the connector 155 of the subsea tree 105. A further end of the jumper 160 is connected to a respective flow line connector 165 of a manifold 170. The manifold 170 is secured to the sea bed via respective manifold support legs 175. FIG. 1 helps illustrate how other connectors 180 can be supported on the manifold 170 and these are connected via respective jumpers to other subsea trees (not shown in FIG. 1). The output from the manifold 170 flows along a single exit pipeline 185 to a remote location. The composition of the fluid flowing along the exit pipeline 185 may be a combination of fluid from multiple subsea trees and that composition may be mixed by allowing fluid from multiple jumpers to flow into the manifold simultaneously. Alternatively the output along the exit pipe 185 may merely be fluid flowing from a single subsea tree.

FIG. 1 also helps illustrate how multiple acoustic sensors can be located to detect acoustic energy in sea water in a region surrounding the jumper 160. Sensors can be located in additional or alternative locations to detect acoustic energy in sea water in other locations. As illustrated in FIG. 1 a first acoustic sensor $190_1$ is located proximate to the sea bed 112 and kept in position via a chain weight 192. The output from the acoustic sensor $190_1$ is connected to the SCM 125. FIG. 1 also helps illustrate how a further acoustic sensor $190_2$ can be supported via an attached buoyancy element 194 to locate the further acoustic sensor $190_2$ at a desired location with respect to the jumper 160. The output from the acoustic sensor $190_2$ is likewise connected to the SCM. In this way one or more acoustic sensors are located spaced apart from each other and from a pipeline (in this example provided by the jumper 160) and can detect acoustic energy imparted into the sea water that surrounds the pipeline caused by vibrations of the pipeline or other structure. In the example shown in FIG. 1 each acoustic sensor is a conventional hydrophone. Each hydrophone itself includes an array of acoustic sensor elements. As an alternative each acoustic sensor can comprise just a single acoustic sensor element.

Each acoustic sensor $190_1$, $190_2$ can detect and over time monitor at least one characteristic associated with acoustic energy in sea water proximate to the sensor. For example each sensor can detect a frequency component in the acoustic energy in the sea water and thus detect an associated frequency of vibration of a vibrating structure which imparts the sea water with energy that is subsequently detected as acoustic energy. Alternatively or additionally each acoustic sensor can determine an amplitude component in the acoustic energy in sea water close to the sensor. This can be used to detect an amplitude of vibration associated with vibration of a pipeline or structure secured to a pipeline. Optionally and/or additionally each acoustic sensor of a plurality of sensors can be used to detect acoustic energy in sea water proximate to the sensor and an incoming direction of the acoustic energy can subsequently be detected from those measurements. This helps establish a likely part or parts of a subsea structure which is vibrating.

It will be appreciated with reference to FIG. 1 that each acoustic sensor is located spaced apart from the subsea tree and jumper and manifold and connecting pipe work. That is to say the sensor used to provide information responsive to vibration does not need to be mounted on the structure. Instead each acoustic sensor can be located distal to a subsea structure and may not even have a line-of-sight spaced apart relationship with that structure. This makes locating the sensors easier than using accelerometers or other fixed vibration detecting elements. Vibration in a structure imparts acoustic energy into sea water and this is transmitted a distance away to be measured by each acoustic sensor. Whilst sensors $190_1$, $190_2$ have been shown in FIG. 1 resting on the sea bed or floating it will be appreciated that there are other techniques for duly locating an acoustic sensor with respect to a structure that is to be monitored. Equally each sensor may detect the same or a different characteristic.

Figure 2:
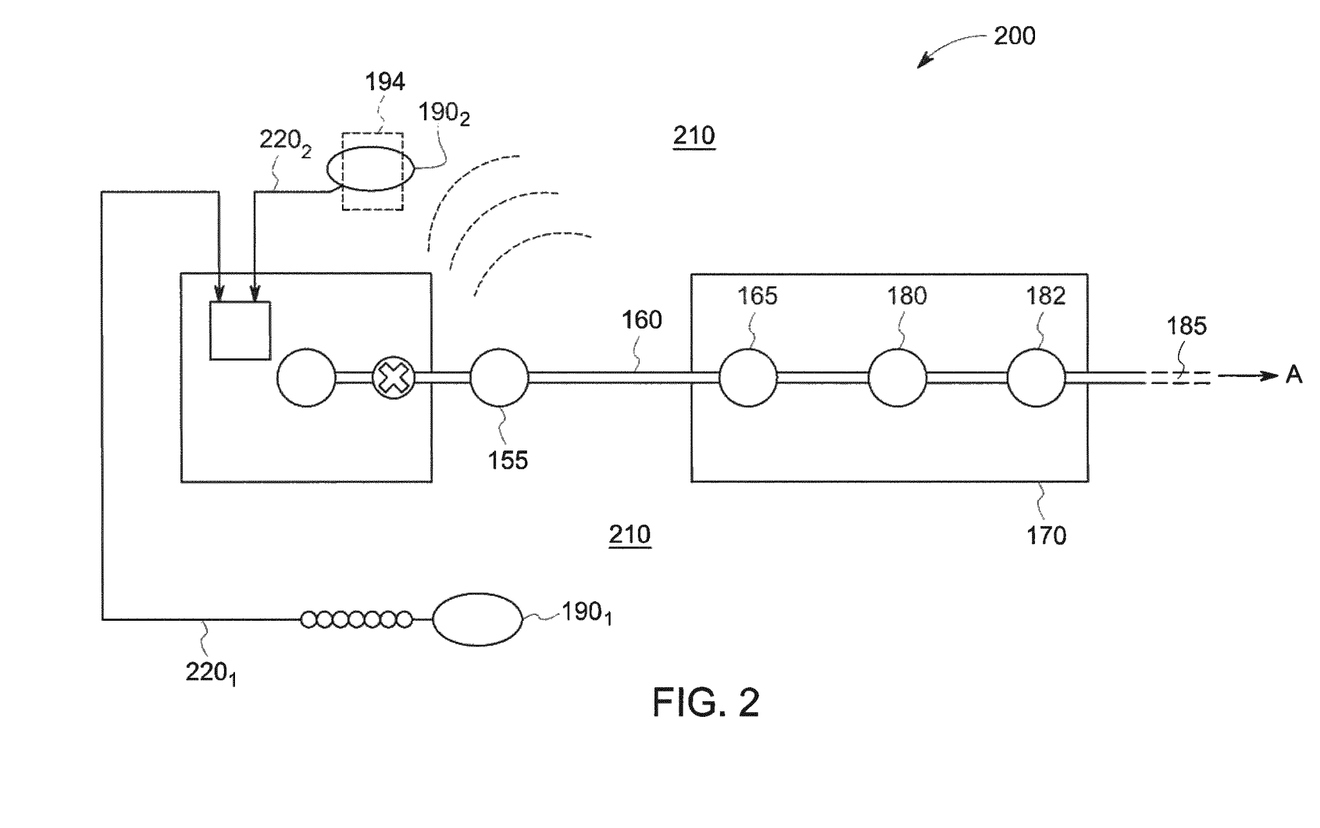
FIG. 2 helps illustrate the subsea environment shown in FIG. 1.

FIG. 2 illustrates the environment and flow connection scheme shown in FIG. 1 but in plan view rather than in elevation. FIG. 2 thus illustrates a top surface of the manifold 170 with the three respective connectors 165, 180, 182. The connector 165 connects a jumper 160 to a rigid connector 155 of the subsea tree 105. During use fluid either as a gas or liquid or combination of gas and liquid and possibly solid particulate flows along a fluid flow pathway including the jumper 160. As fluid flows the velocity of fluid flow in the flow line jumper in combination with the multiphase nature of the flowing fluids, imparts small disturbance forces to the jumper. At undesired resonant frequencies this can be amplified by the structure which creates significant acoustic energy 200. The vibrating jumper or other such structure thus behaves as a point source or multipoint source of acoustic energy waves 200.

As illustrated in FIG. 2 acoustic sensors $190_1$, $190_2$ are located in a spaced apart relationship with the jumper 160 to detect the acoustic energy in the sea water 210. Each acoustic sensor is connected via a wired connection $220_1$, $220_2$ to the SCM 125 of the subsea tree. It will be appreciated that rather than having a wired connection a wireless communication link may alternatively be utilised to link the sensed values from each acoustic sensor to inputs of the SCM. It will likewise be appreciated by those skilled in the art that the vibration of other subsea structures can also provide a point source or multiple point sources for acoustic vibration. As such acoustic sensors can be utilised in a distributed fashion to detect acoustic energy in the sea water generated by vibration of one or more structures.

Figure 3:
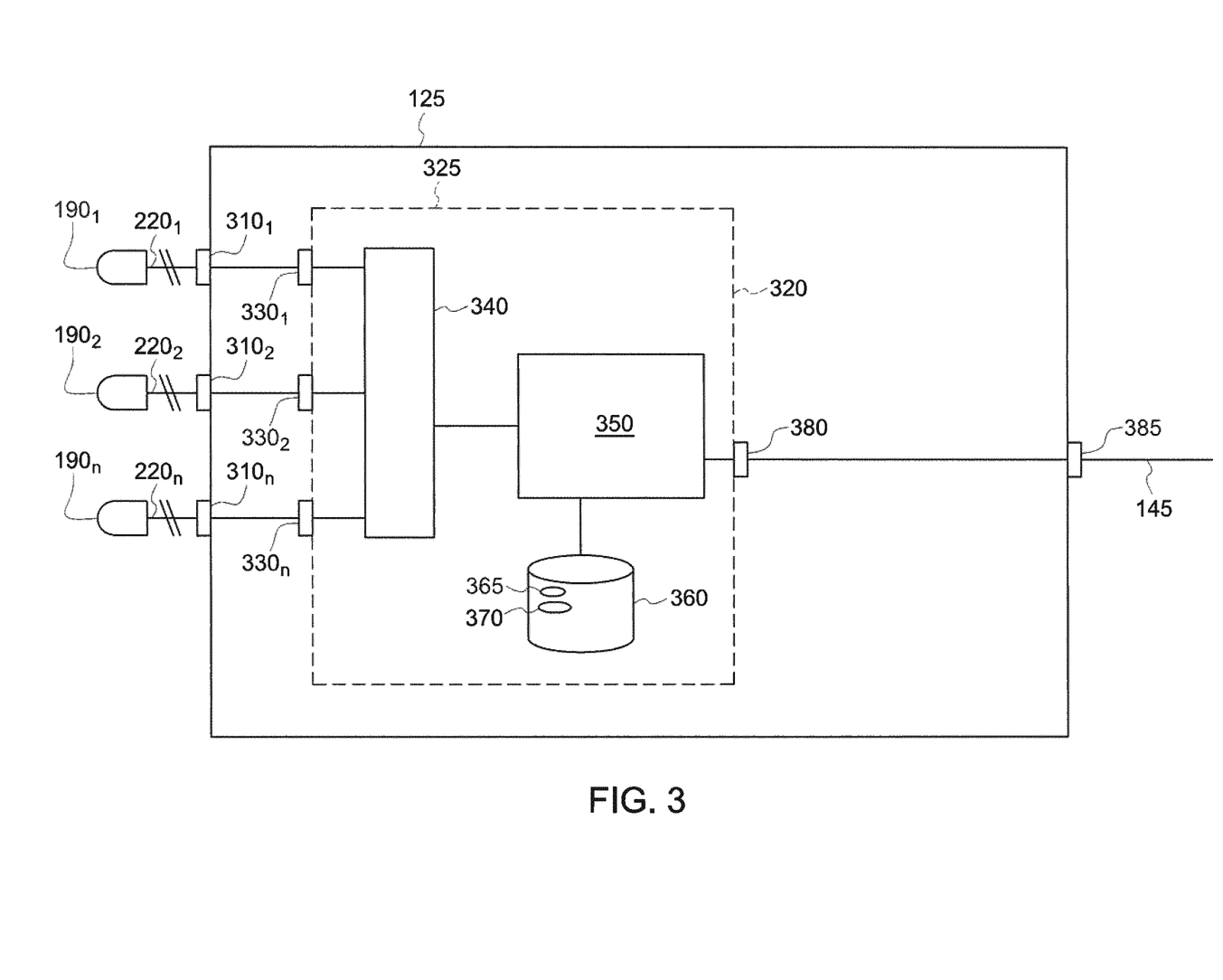
FIG. 3 illustrates component parts of a Subsea Control Module (SCM).

FIG. 3 illustrates the Subsea Control Module (SCM) 125 in the subsea tree 105 in more detail. As illustrated in FIG. 3 each hydrophone 190 is connected via a respective wired connection 220 to a sealed, wet mating connector 310. The SCM receives electrical power, communication signals, and hydraulic power supplies from surface control equipment via an umbilical. Such connections are not shown in FIG. 3.

Redundant supply of communication signals and electrical and hydraulic power may be likewise transmitted through a corresponding umbilical copper core or hose connecting a top side to the subsea tree. The umbilical hose length may be a few hundred metres up to potentially many kilometres in length linking the subsea environment to surface equipment. The SCM is utilised to help distribute power to solenoid piloting valves, pressure transducers and temperature transducers in the subsea tree which can be utilised to control the flow isolation valve 135 and choke valve 140.

A Subsea Electronics Module (SEM) 320 is located within the SCM 125. The SEM is a sealed unit, held at a selected pressure, and containing electronic assemblies which are fed with on board power from a power source (not shown). The SEM has a housing 325 with respective sealed connectors $330_1$ . . . n. These respectively connect to the inputs from each respective acoustic sensor and connect the sensor outputs to a multiplexing and signal processing unit 340. The output from each acoustic sensor is multiplexed one by one and the signal processing unit 340 includes components for amplification and filtering and digitisation (if needed) and optionally some form of digital signal processing. An output from the signal processing unit 340 is provided to an on board controller 350 in the SEM. This is a processing element which has access to a data store 360. The data store 360 includes a first data store region 365 which stores data corresponding to fatigue curves and a further data store region 370 which stores data corresponding to resonant frequency data for the subsea equipment. It will be appreciated that alternatively the data store 360 can include alternative and/or additional data store regions including corresponding data relevant to the assimilation of vibration data and for generating control signal data to enable the SEM 320 and thus the SCM 125 in which the SEM is located to control operation of one or more flow varying elements such as the choke valve 140.

As illustrated in FIG. 3 an output connection from the controller 350 passes through a sealed connector 380 of the SEM to an outlet 385 of the SCM. The wired connection 145 from the SCM is connected to the choke valve 140 shown in FIGS. 1 and 2.

FIG. 3 thus helps illustrate how an output from at least one acoustic sensor (for example a hydrophone $190_1$, $190_2$ . . . $190_n$) can be connected to an SCM 125 in a subsea tree. The position of each acoustic sensor is different so that acoustic energy from one or more sites around a subsea tree and manifold can be detected. The output signals from each acoustic sensor are multiplexed so that one by one each signal is repeatedly extracted and amplified and filtered. Each signal may be converted to a digital signal if needed and digital signal processing carried out as required. The effective outputs from each acoustic sensor can thus be provided one by one (or alone if only one acoustic sensor is used) to a controller which makes reference to the detected characteristics and pre stored data.

For example each acoustic sensor may be set to determine an amplitude of vibration of a subsea structure. Aptly it is desirable to limit this amplitude to a maximum threshold figure. To help achieve this a vibration value associated with vibration of the subsea structure is kept below a predetermined threshold value by varying an operational parameter. Acoustic energy can be measured and the measured amplitude is compared to a lookup table in order to compare the determined amplitude with a predetermined maximum threshold value for amplitude. Providing the measured amplitude is below the predetermined amplitude threshold the control signal on the wired connection 145 indicates to the choke valve to remain unchanged (optionally if amplitude is below the threshold then flow rate can be increased by opening the choke valve a little). If the determined amplitude is greater than the predetermined amplitude threshold value some operational parameter of the fluid flowing along a fluid flow pathway associated with the jumper 160 should be varied. The controller 350 makes this determination to generate the control signal on connecting line 145 which will have the desired effect. For example the choke valve can be slightly closed to thereby reduce the flow rate of fluid. This will have a consequential effect on the vibration of a structure along which the fluid flows or connected to a structure along which the fluid flows. This control will be particularly effective in helping to avoid fluid flow rate and flowing fluid composition operating at a resonant frequency for the structure/pipe work concerned. By varying a rate of flow and/or composition or other such operational parameter operation at resonance can be avoided and vibrational effects thereby radically reduced. It will be appreciated that alternatively or additionally buoyancy elements or weight elements may be released or engaged to vary a resonant frequency profile to reduce vibration. Respective governor elements are included to govern deployment/status of such resonance frequency varying elements.

The data store 360 stores threshold values and other data so that a maximum flow rate can be provided along the flow line without vibration at one or more subsea structures reaching an unsafe limit. This enables the flow rate to be maintained on "just acceptable" limits thus maximising flow rate.

Certain embodiments of the present invention have been described hereinabove with reference to implementation of a system at a "green field site". That is to say where the characteristics of subsea structures are clearly defined by virtue of them being newly designed and constructed. As such during the design and construction phase resonance frequency curves detailing the likely resonance frequency or multiple resonance frequencies associated with a subsea structure are defined and can be pre stored as resonant frequency data for the subsea equipment. As previously discussed such data can be stored in a first data store region 365 of a data store 360 in an SEM. Other data such as fatigue curve data associated with the newly designed and constructed equipment can likewise be stored.

However certain embodiments of the present invention are usable at so-called "brown field sites". Such a site may have been in operation for varying purposes over a significant period of time. Data associated with a subsea structure or multiple subsea structures at such a brown field site may never have been recorded or may now be lost. Alternatively over time modifications or wear and tear of the subsea structure may have varied resonance frequency details for the subsea structure. Certain embodiments of the present invention can be usable in such environments to determine a resonant frequency or multiple resonance frequencies associated with a subsea structure. The results can then be stored in an appropriate data store region. Additionally or alternatively a repeated check can be carried out even at "green field sites" periodically to see that stored resonant frequency data corresponds with frequencies at which a structure actually resonates.

In such embodiments rather than varying an operational parameter to avoid operation at a resonance frequency an operational parameter, such as flow rate or composition can intentionally be varied to actually find resonant frequencies. These can then be mapped for future use. Optionally a full range of an operational parameter can be tried. For example a flow rate can be reduced to zero and then gradually increased over a predetermined period of time to a maximum possible flow rate for the pipeline in question. As flow rate varies over time the acoustic sensors will determine acoustic energy in sea water energised by any vibration of the subsea structure. It will be appreciated that at certain points the acoustic energy will go through maximum values. This is indicative of resonance in a subsea structure. A flow rate associated with that moment in time can be stored for future reference. A rate of change of acoustic energy can also optionally or additionally help indicate a resonant range. Likewise a frequency of vibration can be determined using one or more acoustic sensors and this can likewise be utilised to determine a respective resonant frequency associated with a subsea structure.

In this way certain embodiments of the present invention enable pre stored data associated with a "green field site" to be constantly tailored, for example during a maintenance phase, to maximise accuracy. Alternatively certain embodiments of the present invention can be implemented at so-called "brown field sites" to first establish likely resonance frequencies associated with a subsea structure in the state it is in at that moment in time. Thereafter flow induced vibration of the subsea structure can be reduced by detecting at least one characteristic associated with acoustic energy in sea water proximate to an acoustic sensor and responsive to the detected characteristic, varying at least one operational parameter of fluid flowing along a fluid flow pathway associated with a pipe.

It will be appreciated that whilst the controller 350 and associated data store 360 have been shown in FIG. 3 as part of the SEM 320 of an SCM 125, as an alternative that "intelligence" may be provided top side with the acoustic sensor outputs being provided via an umbilical data connection to a top side controller. Thereafter control signals from the top side controller can be provided via the umbilical to the SCM to control a state of the choke valve 140.

Certain embodiments of the present invention enable the use of subsea acoustic sensors to detect and measure vibration of subsea structures and components. When vibrating each structure imparts acoustic energy (pressure waves) to the surrounding sea water. This can be remotely detected in frequency, amplitude and direction from the remote sensing location. Unlike a vibration sensor such as an accelerometer, acoustic sensing does not need to be placed exactly at a point of vibration. Thus sensors do not need to be attached to the vibrating structure but can be located in the broad vicinity of the structure to pick up changes in energy levels of the surrounding equipment. This can be carried out without the need for line-of-site. Aptly certain embodiments of the present invention can be utilised to monitor and control flow induced vibration in flow line jumpers.

According to certain embodiments of the present invention each acoustic sensor can provide an output which is usable to automatically operate in a "closed loop" control system. Optionally as an alternative an "open loop" mode of operation which involves a human operator to increase or decrease flow rates can be utilised. The subsea system is based on vibration data detected through remote acoustic monitoring. Comparison with fatigue curves and/or resonant frequencies for the subsea equipment (or other inputs) informs an operator how to modulate flow to protect subsea structures and/or extend subsea asset life. In an alternative closed loop fashion in-built intelligence of the subsea control module (or optionally via a top side module) will determine how to adjust a choke valve position (to either increase or reduce flow) in order to reduce the measured vibration to acceptably low levels. It will be appreciated that as an alternative or in addition to varying flow rate other operational parameters associated with fluid flow can be altered to thereby avoid resonance and reduce vibration. For example a composition of fluid flowing could be controlled by introducing fluid from different geological layers in a subsea well (which may contain different compositions of gas/liquid/solid). Alternatively incoming fluid from multiple subsea trees could be mingled to vary the composition.

According to certain embodiments of the present invention closed loop control is possible using the electronic data processor as a controller 350 from a Subsea Electronic Module (SEM). Such an SEM, it will be appreciated, also can be used to provide control signals, optionally through a solenoid operated pilot system, to a position of a choke valve.

Certain embodiments of the present invention thus provide for monitoring of flow induced vibration in subsea oil and gas process lines using remote, passive acoustic sensors an adjustment of the flow. This can be achieved either manually or automatically using closed loop computational control to mitigate vibration experienced particularly at resonant frequencies of the process line.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method for reducing flow induced vibration in at least one subsea structure, comprising the steps of:
   via at least one subsea acoustic sensor, detecting at least one characteristic associated with acoustic energy in sea water proximate to the sensor;
   responsive to the detected characteristic, varying at least one operational parameter of a fluid flowing along a fluid flow pathway associated with a pipe member by automatically comparing a characteristic value comprising a value for the detected at least one characteristic, with at least one pre-stored value and automatically varying the operational parameter responsive thereto; and
   automatically varying the operational parameter to (i) maintain a vibration value associated with vibration of the subsea structure below a predetermined threshold value, and (ii) maximize the operational parameter whilst maintaining said vibration value below the predetermined threshold value.

2. The method of claim 1, wherein the step of varying at least one operational parameter comprises varying a flow rate of said fluid.

3. The method of claim 2 further comprising varying flow rate by selectively opening and/or closing a choke valve member in the fluid flow pathway.

4. The method of claim 1, wherein the step of varying at least one operational parameter comprises varying a composition of the fluid.

5. The method of claim 1 further comprising automatically varying the operational parameter via a closed loop control system.

6. The method of claim 1, wherein the step of detecting at least one characteristic comprises determining a frequency and/or amplitude and/or incoming direction of the acoustic energy.

7. The method of claim 1, wherein said step of detecting at least one characteristic comprises, via a subsea acoustic sensor, detecting acoustic energy in sea water proximate to the sensor.

8. The method of claim 7, wherein said step of detecting acoustic energy comprises detecting acoustic energy in sea water distal to a subsea structure.

9. A method for reducing flow induced vibration in at least one subsea structure, comprising the steps of:
   via at least one subsea acoustic sensor, detecting at least one characteristic associated with acoustic energy in sea water proximate to the sensor;
   responsive to the detected characteristic, varying at least one operational parameter of a fluid flowing along a fluid flow pathway associated with a pipe member by automatically comparing a characteristic value comprising a value for the detected at least one characteristic, with at least one pre-stored value and automatically varying the operational parameter responsive thereto; and
   selectively varying said detected operational parameter to determine when the selected operational parameter value provides a minimum amplitude in the acoustic energy, and subsequently maintaining the operational parameter at the selected operational parameter value for a predetermined period of time comprising more than 5 seconds.

10. An apparatus for reducing flow induced vibration in at least one subsea structure, comprising:
    at least one subsea acoustic sensor configured to generate an output signal indicating at least one characteristic associated with detected acoustic energy in sea water, the at least one subsea acoustic sensor comprising a first acoustic sensor configured to be maintained at a location proximate to a sea bed onto which a section of the apparatus is positioned, and a second acoustic sensor affixed to a buoyancy element configured to maintain the second acoustic element at a location above the first acoustic element and the sea bed;

a processor element configured to receive a respective output signal from the at least one subsea acoustic sensor and provide a control output signal responsive thereto; and at least one governor element having a plurality of selectable states, each selectable state responsive to the control output signal to vary at least one operational parameter of a fluid flowing along a fluid flow pathway associated with a pipe member of a flow line by automatically comparing a characteristic value, comprising a value for the at least one characteristic, with at least one pre-stored value and automatically varying the operational parameter responsive thereto.

11. The apparatus of claim 10, wherein the governor element comprises a choke valve having at least a closed state and a fully open state.

12. The apparatus of claim 10, wherein the governor element comprises at least one valve that determines a composition of fluid flowing along the fluid flow pathway.

13. The apparatus of claim 10, wherein the processor element receives data from a data store comprising resonance data for the subsea structure and/or the pipe member and/or fatigue curve data for the subsea structure and/or the pipe member.

14. The apparatus of claim 10, wherein the at least one subsea acoustic sensor is a plurality of hydrophones, each of the plurality of hydrophones connected to a respective connector of the flow line.

\* \* \* \* \*